United States Patent
Haddock et al.

(10) Patent No.: US 10,869,433 B1
(45) Date of Patent: Dec. 22, 2020

(54) TREE TRIMMING APPARATUS AND METHOD

(71) Applicant: Rotor Blade, Pawleys Island, SC (US)

(72) Inventors: Ashley Clayton Haddock, Pawleys Island, SC (US); Layne Edwin Leoffler, III, Conway, SC (US)

(73) Assignee: Rotor Blade

( * ) Notice: Subject to any disclaimer, the term of this patent is extended or adjusted under 35 U.S.C. 154(b) by 372 days.

(21) Appl. No.: 15/019,432

(22) Filed: Feb. 9, 2016

(51) Int. Cl.
*A01G 23/095* (2006.01)
*B23D 45/00* (2006.01)

(52) U.S. Cl.
CPC ......... *A01G 23/095* (2013.01); *B23D 45/003* (2013.01)

(58) Field of Classification Search
CPC .... A01G 23/08; A01G 23/091; A01G 23/095; A01G 3/0408; A01G 3/0426; A01G 3/0435; A01G 3/085; A01G 3/088; B23D 45/003
USPC .......................................................... 144/343
See application file for complete search history.

(56) References Cited

U.S. PATENT DOCUMENTS

| | | | | |
|---|---|---|---|---|
| 4,554,781 A * | 11/1985 | Rogers | ................ | B23D 45/105 56/11.9 |
| 4,627,227 A * | 12/1986 | Dixon | ................ | A01G 23/095 56/235 |
| 4,815,263 A * | 3/1989 | Hartung | ................ | A01G 23/095 144/24.13 |
| 4,984,757 A * | 1/1991 | Hartung | ................ | B64D 1/22 144/24.13 |
| 5,961,070 A * | 10/1999 | Bradford | ................ | B64D 1/22 144/335 |
| 6,167,928 B1 * | 1/2001 | Jarman | ................ | A01G 23/065 144/335 |
| 6,263,932 B1 * | 7/2001 | Chalifoux | ................ | A01G 23/08 144/24.13 |
| 6,394,156 B1 * | 5/2002 | Ahvenlampi | ................ | A01G 23/091 144/24.13 |

(Continued)

FOREIGN PATENT DOCUMENTS

AU 2004202358 A1 * 12/2005

OTHER PUBLICATIONS

YouTube video: "Helicopter, air saw trimming trees" Published Aug. 6, 2013 by American Transmission Co. screenshot https://www.youtube.com/watch?v=Sp0DqARvjwY.*

(Continued)

*Primary Examiner* — Shelley M Self
*Assistant Examiner* — Smith Oberto Bapthelus
(74) *Attorney, Agent, or Firm* — C. Brandon Browning; Maynard, Cooper & Gale, PC

(57) ABSTRACT

An apparatus and method for removing the tops of trees, the apparatus including a rotatable first boom configured for coupling to and extending vertically downward from an aircraft and a cutting assembly hingedly coupled to a bottom end portion of the first boom. The cutting assembly includes a housing containing a motor, the housing having an upper portion coupled to the bottom end portion of the first boom. A second boom extends from a lower portion of the housing and supports thereon a singular circular saw which is operatively coupled to the motor. The second boom is arranged at an angle of about 30° to about 55° relative to the first boom. This accomplished by including bend within the housing.

18 Claims, 5 Drawing Sheets

(56) References Cited

U.S. PATENT DOCUMENTS

| | | | | |
|---|---|---|---|---|
| 8,534,608 B1* | 9/2013 | Cox, IV | ............... | A01G 23/095 |
| | | | | 244/118.1 |
| 9,192,947 B1* | 11/2015 | Haddock | .................. | B64D 1/18 |
| 9,456,559 B2* | 10/2016 | Dunn | .................... | A01G 23/095 |
| 2003/0159757 A1* | 8/2003 | Tingstad | ............. | A01G 23/095 |
| | | | | 144/24.13 |
| 2004/0000409 A1* | 1/2004 | Abbott | ................. | A01G 23/095 |
| | | | | 169/45 |
| 2008/0105332 A1* | 5/2008 | Lippits | ................. | A01G 23/095 |
| | | | | 144/24.13 |
| 2009/0000698 A1* | 1/2009 | Beresford | .............. | A01G 23/08 |
| | | | | 144/336 |
| 2013/0239711 A1* | 9/2013 | Garside | .................. | A63B 27/00 |
| | | | | 74/25 |
| 2014/0209210 A1* | 7/2014 | Dunn | ................... | A01G 23/095 |
| | | | | 144/24.13 |
| 2014/0299230 A1* | 10/2014 | Cox, III | ............... | A01G 23/095 |
| | | | | 144/24.13 |

OTHER PUBLICATIONS

Author: Helicopter Online Ground School Title: Helicopter Tree Sawing in the MD 500 https://www.youtube.com/watch?v=Pla06PO60dk (Year: 2015).*

* cited by examiner

TREE TRIMMING APPARATUS AND METHOD

FIELD OF THE INVENTION

The present invention is directed to an apparatus and method for trimming vegetation, and more particularly, to a method for removing the tops of trees by cutting the tree tops with a saw suspended from an aircraft.

BACKGROUND OF THE INVENTION

Aerial saws for trimming vegetation are known in the art. For example, U.S. Pat. No. 4,554,781 discloses a tree trimmer apparatus including a boom hanging vertically downward from a helicopter and carrying a plurality of circular saws arranged with their blades nearly adjacent over a length of the boom. The boom is attached to the helicopter in a manner that prevents rotation about a vertical axis while allowing rotational movement about a horizontal axis at right angles to the normal direction of motion of the helicopter. The blades are powered by a hydraulic motor with hydraulic fluid under pressure from a pump in the helicopter.

U.S. Pat. No. 4,815,263 discloses an airborne tree trimming apparatus including a boom extension vertically suspended from a helicopter and a plurality of circular saw blades arranged in a tandem, coplanar relationship on an operating boom which is attached to the boom extension by means of a boom pivot. The circular saw blades rotate about parallel, substantially horizontal axes which are oriented substantially at right angles to the normal direction of motion of the helicopter and are belt-driven by an internal combustion engine which is mounted on the operating boom, above the circular saw blades.

U.S. Pat. No. 5,961,070 discloses an aerial chain saw suspended from a helicopter by a non-rigid suspension system. A continuous chain extends around a chain saw bar, driven by a sprocket. Hydraulic lines to and from the helicopter provide hydraulic power to a hydraulic motor mounted at the upper end of the bar.

SUMMARY OF THE INVENTION

The present invention is directed to an apparatus and method for removing the tops of trees with a saw suspended from an aircraft. According to one aspect of the invention there is provided a tree trimming apparatus including a rotatable first boom configured for coupling to and extending vertically downward from an aircraft and a cutting assembly hingedly coupled to a bottom end portion of the first boom. The cutting assembly includes a housing containing a motor, the housing having an upper portion coupled to the bottom end portion of the first boom. A second boom extends from a lower portion of the housing and supports thereon a circular saw which is operatively coupled to the motor. The second boom is arranged at an angle of about 30° to about 55° relative to the first boom. This accomplished by including bend within the housing. In particular, the housing includes a front wall, a rear wall and opposing lateral walls connecting the front and rear walls together, the front and rear walls each including a bend forming an angle of about 30° to about 55°.

In use, the apparatus is suspended from a helicopter and transported to a tree to be trimmed. When in transit, the first boom is maintained in a first position with the second boom extending away from a forward direction of travel of the helicopter. This arrangement is more aerodynamic than having the second boom extending laterally or forward relative to the direction of travel of the helicopter. As the helicopter approaches the tree, the first boom is rotated into a second position with the second boom extending laterally from the forward direction of travel of the helicopter. This arrangement of the second boom allows the helicopter pilot to more easily view the tree to be trimmed and engagement of the circular saw with the tree than if the second boom extended toward the front or rear of the helicopter. As the apparatus is moved towards the tree, a bottom end portion of the second boom, which extend below a lower edge of the circular saw is used to guide the saw towards the tree top so that the saw may engage and cut the tree top.

According to another aspect of the invention there is provided a tree trimming apparatus including a first boom portion extending vertically downward from a helicopter, a second boom portion coupled to and suspended from the first boom portion, the second boom portion being arranged at about a 40° angle to about a 50° angle to the first boom portion, and a cutting member supported by the second boom portion. A housing containing a power source operatively coupled to the cutting member is coupled to and between the first boom portion and the second boom portion. In particular, a hinge joint operatively couples the first boom portion to the housing, which in turn, is rigidly coupled to the second boom portion.

According to yet another aspect of the invention, there is provided a tree trimming apparatus including a flexible first boom rotatably coupled to and extending vertically downward from an aircraft, housing containing a fuel tank and a motor operatively coupled to the fuel tank, the housing having an upper portion hingedly coupled to the bottom end portion of the first boom, a rigid second boom rigidly coupled to and extending downwardly from the housing, and a circular saw operatively coupled to the motor and supported by the second boom. To assist the aircraft pilot with engaging the tree top and preventing pinching of the saw blade as it cuts through a tree top, the second boom is arranged at an angle of about 45° relative to the first boom and includes a guide portion extending below a lower edge of the circular saw. In use, the apparatus is positioned above a tree and the guide portion of the second boom is engaged with a tree top for guiding the circular saw towards the tree top.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE DRAWINGS

Figure 1:
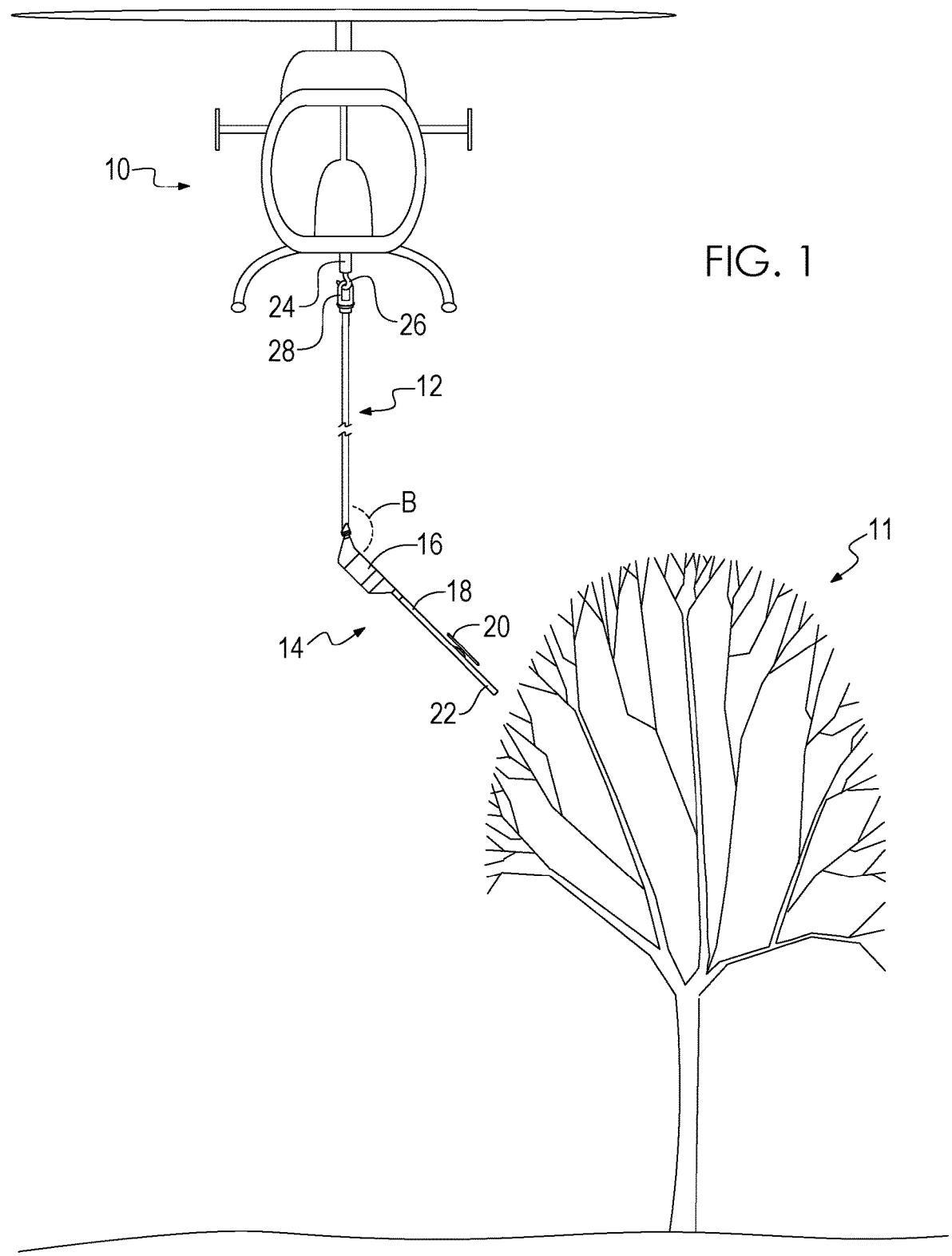
FIG. 1 depicts a tree trimming apparatus and method of using same in accordance with the present invention.

The present invention is directed to a tree trimming system for cutting or removing the tops of trees. As depicted in FIG. 1, the system generally includes an aircraft such as a helicopter 10, a first boom 12 coupled to and extending vertically underneath helicopter 10 and a cutting assembly 14, the cutting assembly consisting of a motor housing 16, a second boom 18 and a circular saw 20, the circular saw and the second boom being arranged at a desired angle relative to first boom 12. In use, helicopter 10 is positioned over a tree 11 with first boom 12 rotated so that second boom 18 extends laterally relative to helicopter 10. As cutting assembly 14 is moved towards tree 11, a guide portion 22 formed by a bottom end portion of second boom 18 is used by the helicopter pilot to guide saw 20 towards the tree top so that the saw may engage and cut the tree top.

Referring to FIG. 1, the underside of helicopter 10 is fitted with a hook motor 24 having a rotatable shaft extending downwardly therefrom and terminating in a hook 26. Suspended from hook 26 is first boom 12. First boom 12 may be constructed from a fifty foot, approximately three inch diameter aluminum pipe. The length of first boom 12 can be greater, for example, if the tree tops to be cut are adjacent to structures that are taller than the trees such as power lines or towers. Rigidly coupled to the upper end of first boom 12 is a loop 28 through which hook 26 is secured. The attachment of loop 28 to hook 26 allows the pilot to selectively rotate first boom 12 in either direction by remotely activating hook motor 24. It is contemplated that a redundant hooking system may be used to secure and suspend first boom 12 from helicopter 10. Such a system may include, in addition to hook 26, a chain coupled to and been first boom 12 and helicopter 10 or hook 26. It is also contemplated that a hooking system may be implemented giving the pilot the option of remotely releasing first boom 12 from helicopter 10 in an emergency, for example, if saw 20 or guide portion 22 becomes entangled in a tree or power line. Such a system may include means for detaching hook motor 24 from the underside of helicopter 10 or releasing hook 26 from hook motor 24.

Figure 2:
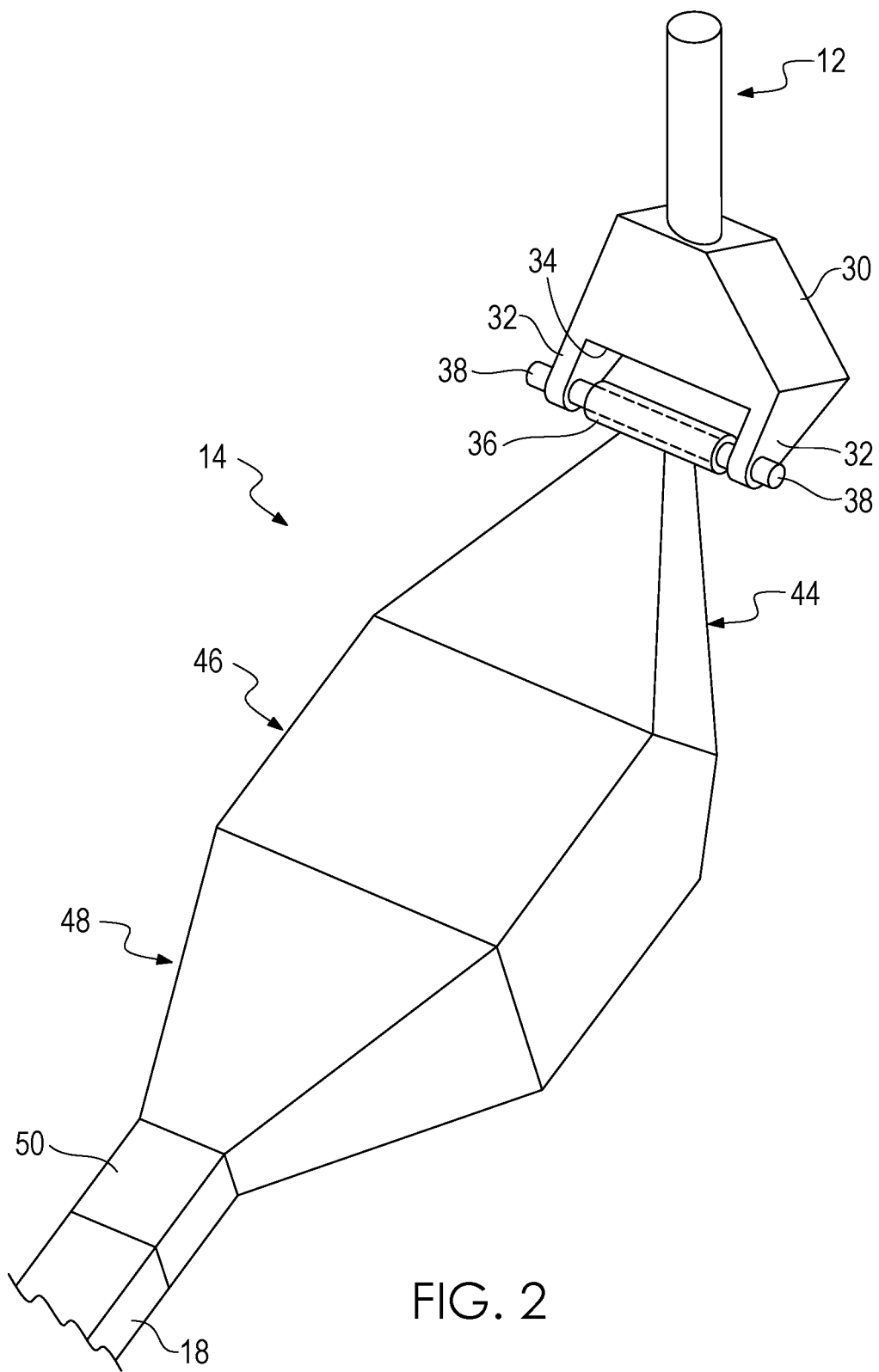
FIG. 2 is a perspective view of a coupling between a first boom and a cutting assembly of the tree trimming apparatus of FIG. 1.

Referring to FIG. 2, located at the bottom end of first boom 12 is a bracket 30 rigidly coupled thereto. Bracket 30 is configured for hingedly coupling first boom 12 to cutting assembly 14. Bracket 30 includes opposing arms 32 which, in part, define a slot 34. Integrally formed with the top end of motor cage 14 is a cylinder 36. Cylinder 36 is configured for being received within slot 30 and secured between opposing arms 32 by a pin 38. In particular, pin 38 extends to and between opposing arms 32 and is securely fixed there between. Arranged in this manner, cylinder 36 and cutting assembly 14 are free to rotate about pin 38.

As illustrated in FIG. 2, the rotational axis defined by rotation of cylinder 36 about pin 38 is not arranged perpendicularly to the rotational axis of first boom 12. Rather, the rotational axes are tilted relative to one another. As explained below, the angle formed by the intersection of rotational axes about pin 38 and first boom 12, in combination with the design of motor cage 14, ensures that a plane formed by saw 20 intersects first boom 12 or the rotational axis thereof at about a 135° angle. This way, when in use, saw 20 can engage a vertically extending branch or top of tree 11 at an angle of about 45°, which increases the cutting efficiency of the saw 20 while decreasing pinching of saw 20 by the vertically extending portion of the tree during cutting.

More particularly, as depicted in FIGS. 2 through 5, motor cage 16 includes a first wall 40 forming a first face, a second wall 42 forming a second face and a pair of opposing side walls coupling first and second walls 40, 42 together to form an enclosure. The enclosure has an upper portion 44 having a generally conical or pyramid shape terminating at the upper end thereof at cylinder 36, a middle portion 46 having a generally rectangular shape and a lower portion 48 having a generally half-conical or half-pyramid shape. Upper portion 44 is arranged at angle relative to middle portion 46 with first and second walls 40, 42 forming complimentary bends. The angles formed between the upper and middle portions 44, 46 by the bends, in combination with the angle formed between the rotational axes of first boom 12 and cylinder 36 about pin 38, are configured to make sure saw 20 is maintained at an angle of about 45° relative to tree 11 during cutting.

Figure 3:
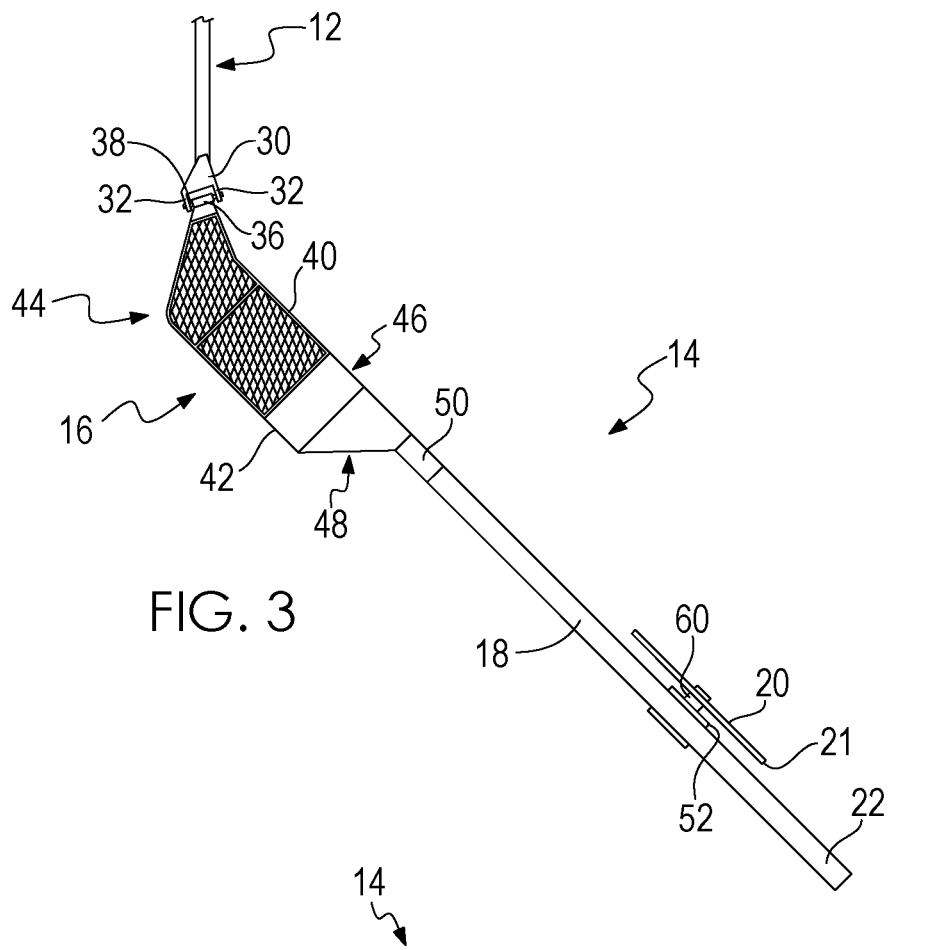
FIG. 3 is an elevational view of a side of the apparatus of FIG. 1.
Figure 4:
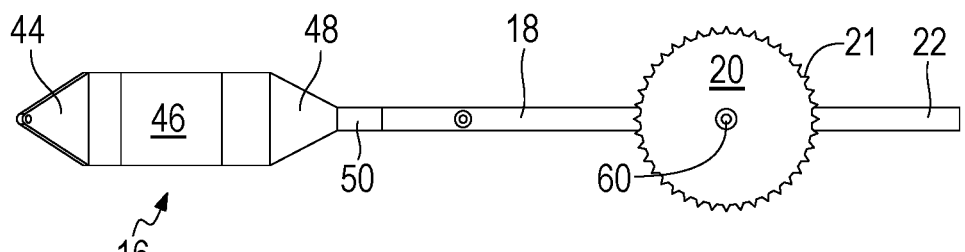
FIG. 4 is a top plan view of the tree trimming apparatus of FIG. 1.
Figure 5:
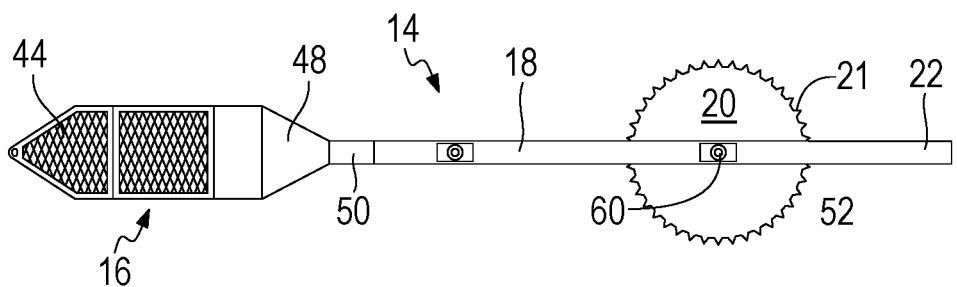
FIG. 5 is a bottom plan view of the tree trimming apparatus of FIG. 1.

Referring to FIGS. 3 through 5, the lower end of lower portion 48 of motor cage 16 terminates in a rectangular sleeve 50. Sleeve 50 defines an opening into which an upper end of second boom 18 is rigidly secured by bolts or the like. AS best illustrated in FIG. 3, first face of first wall 4 is essentially coplanar with the face of second boom 18 from which saw 20 extends. Second boom 18 is constructed of rectangular steel tubing having a length of about 11'. Located about 4 feet from the lower end of second boom is a saw connection bracket 52 for rotatably securing saw 20 to second boom 18. That portion of the lower end of second boom 18 that extends downwardly from a periphery 21 of saw 20 is referred to as the guide portion 22.

Figure 6:
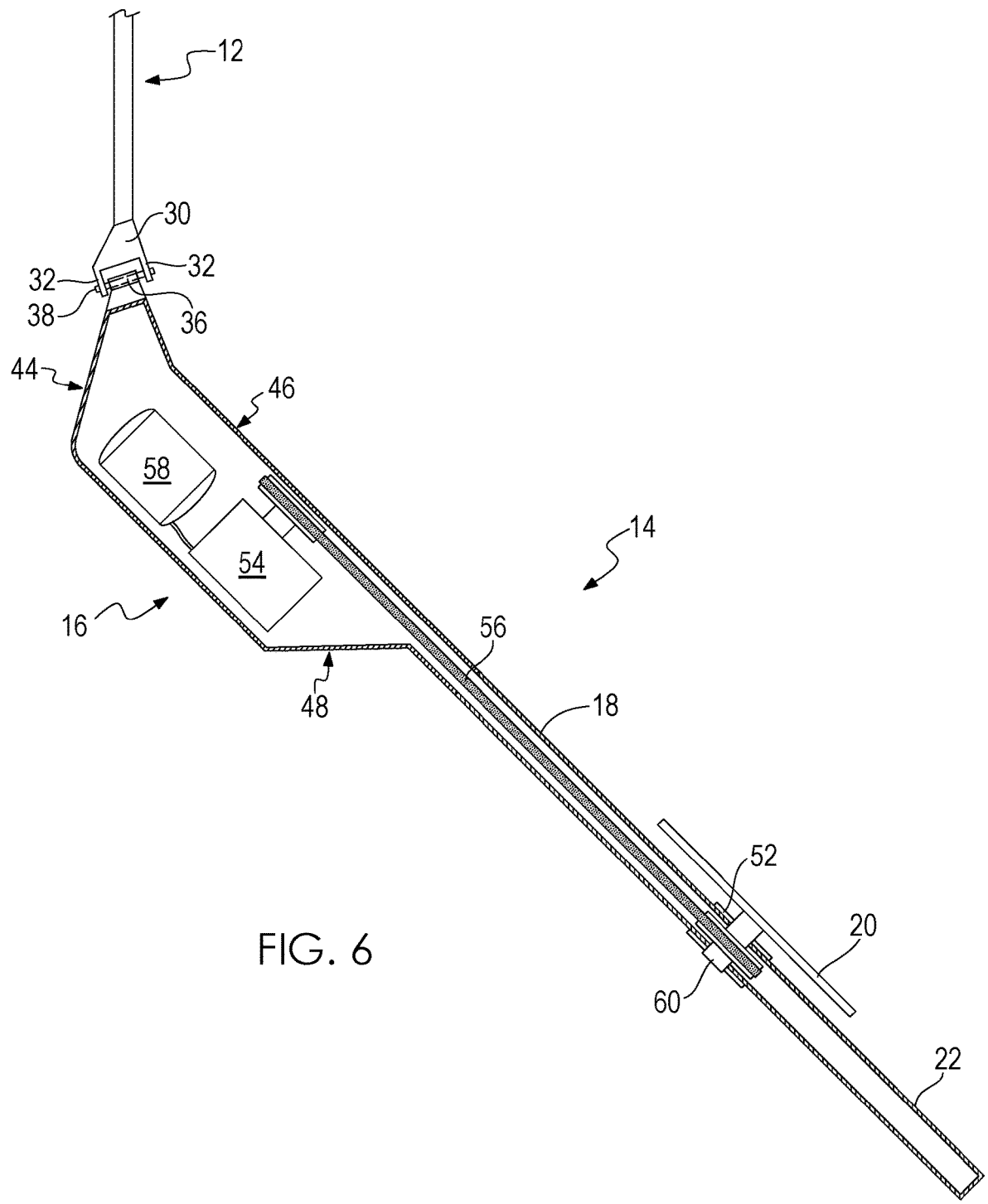
FIG. 6 is a section view of the tree trimming apparatus of FIG. 1.

Referring to FIG. 6, saw 20 is operatively coupled to a saw motor 54 contained within motor cage 16 by a continuous belt 56. Belt 56 engages a wheel that is rotatably coupled to a drive shaft of the motor. Belt 56 extends downwardly through hollow second boom 18 and engages a wheel that is operatively coupled to a saw shaft 60. Upon rotation of saw shaft 60, saw 20 is caused to rotate. Fuel for saw motor 54 is stored in tank 58, which is also contained within motor cage 16.

When in use, cutting assembly 14 is coupled to first boom 12 as described above and suspended underneath helicopter 10. During transport to a worksite, first boom 12 is rotated such that second boom 18 is aligned with the forward direction of travel of the helicopter, with the second boom trailing behind motor cage 16. Trailing second boom 18 behind motor cage 16 minimizes the amount of drag created by the cutting assembly as it is moved through the air.

Figure 7:
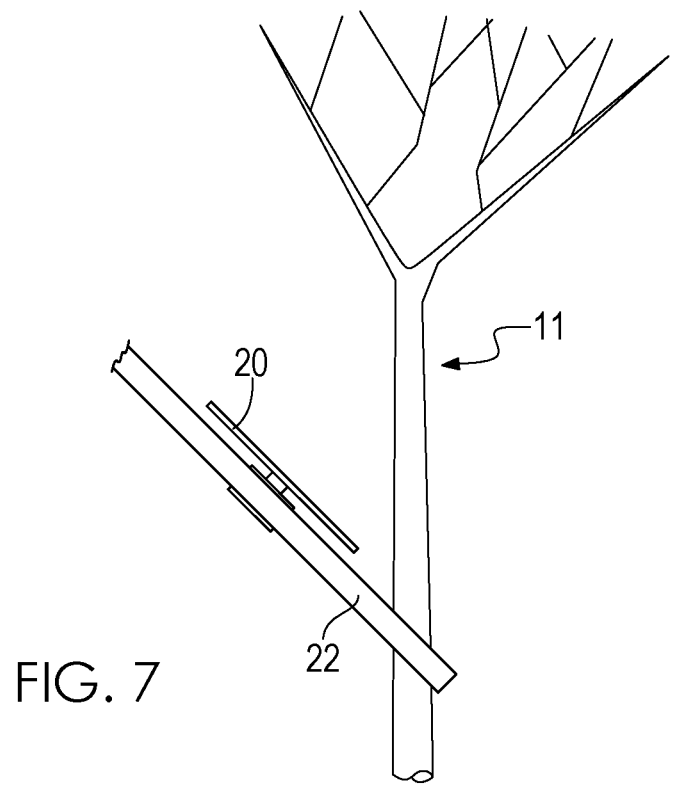
FIG. 7 depicts a guide portion of the tree trimming apparatus of FIG. 1 engaging a tree for cutting.
Figure 8:
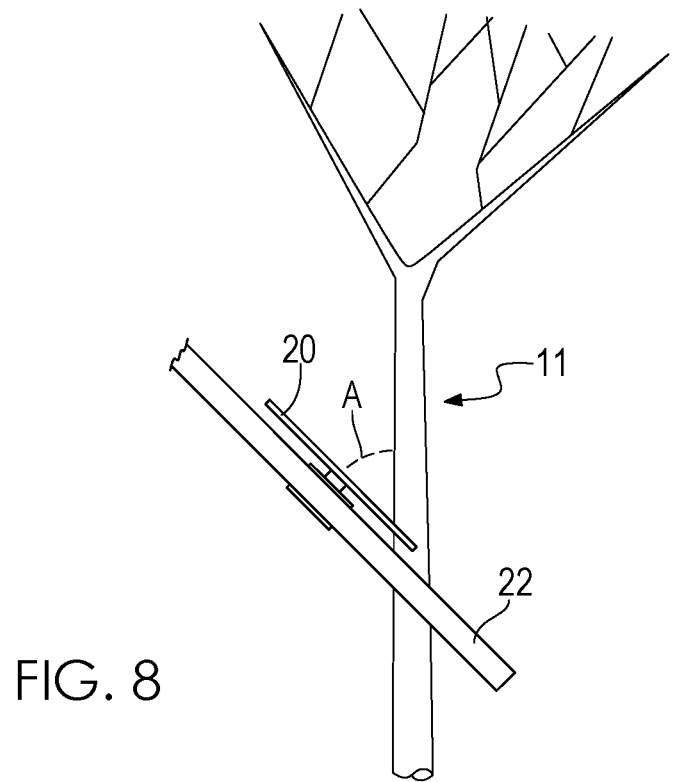
FIG. 8 depicts the tree trimming apparatus of FIG. 7 cutting the tree.

Referring to FIGS. 1, 7 and 8, once helicopter 10 reaches the worksite, the pilot remotely activates hook motor 24 and thereby rotates first boom 12 90° so that second boom 18 extends out laterally relative to the helicopter. This is done so that the pilot can see saw 20. The pilot then remotely activates saw motor 54 causing saw 20 to rotate. The pilot moves saw 20 towards tree 11 until guide portion 22 of second boom 18 contacts tree 11. With guide portion 22 pressing against tree 11, the pilot moves saw 20 toward tree 11 so that saw 20 may engage and cut tree 11. When engaged with tree 11, saw 20 will form an angle A of about 45° relative to tree 11 and an angle B of about 135° relative to first boom 12. By engaging tree 11 at a 45° with saw 20, the tree is less likely to pinch saw 20 and thereby hinder cutting than if saw 20 were arranged at about a 90° angle to tree 11. Following cutting of tree 11, the pilot remotely deactivates saw motor 54 and activates hook motor 24 for rotating second boom 18 back into the transport position.

As will be understood by those familiar with the art, the present invention may be embodied in other specific forms without departing from the spirit or essential characteristics thereof. Accordingly, the disclosures and description herein are intended to be illustrative, but not limiting, of the scope of the invention which is set forth in the following claims.

What is claimed is:

1. A method of trimming a tree comprising:
providing a tree trimming apparatus including a first boom and a cutting assembly coupled to a bottom end portion of the first boom, the cutting assembly including,
 a housing containing a motor, the housing having an upper portion coupled to the bottom end portion of the first boom,
 a second boom extending downward from a lower portion of the housing and at an angle relative to the first boom, and
 a circular saw operatively coupled to the motor and supported by the second boom,
coupling a top end portion of the first boom to an aircraft and suspending the tree trimming apparatus from the aircraft, and
engaging the circular saw with the tree,
wherein the second boom is arranged to extend laterally relative to the aircraft as the circular saw engages with the tree whereby a pilot can view engagement of the circular saw with the tree as the tree is trimmed.

2. The method of claim 1 wherein, when the circular saw engages the tree, the circular saw defines a plane that intersects the first boom at an angle of 135°.

3. The method of claim 1 wherein the circular saw engages the top of the tree at an angle of 45°.

4. The method of claim 1 including rotating the first boom relative to the aircraft so that the second boom extends rearward from the housing relative to the aircraft so that the tree trimming apparatus is aerodynamically oriented for transporting the tree trimming apparatus to and from a site of the tree.

5. The method of claim 1 wherein the aircraft is a helicopter.

6. The method of claim 1 including engaging a length of the second boom that extends below a lower edge of the circular saw with the tree and using the length to guide the circular saw towards a top of the tree, wherein the length of the second boom that extends below the circular saw is free of any other circular saw.

7. A method of trimming a tree comprising:
providing a tree trimming apparatus including a motor, a first boom, a second boom hingedly coupled and arranged at an angle to the first boom and a circular saw supported on the second boom and operatively coupled to the motor,
coupling the first boom to an aircraft and suspending the tree trimming apparatus from the aircraft, and
engaging the circular saw with the tree,
wherein the second boom is arranged to extend laterally relative to the aircraft as the circular saw engages with the tree whereby so that a pilot can view the engagement of the circular saw with the tree.

8. The method of claim 7 including arranging the circular saw to define a plane that intersects the first boom at an angle of 135°.

9. The method of claim 7 including engaging the circular saw with a top of the tree at an angle of 45°.

10. The method of claim 7 including rotating the first boom relative to the aircraft so that the second boom is angled rearward relative to the aircraft.

11. The method of claim 7 wherein the aircraft is a helicopter.

12. The method of claim 7 including engaging a length of the second boom that extends below a lower edge of the circular saw with the tree for guiding the circular saw towards a top of the tree.

13. A method of trimming a tree comprising:
providing a tree trimming apparatus including a first boom, a second boom having a longitudinal axis, a motor housing coupled to and between the first boom and the second boom and a saw supported on the second boom,
coupling the first boom to an aircraft and suspending the tree trimming apparatus from the aircraft,
arranging the second boom so that the longitudinal axis extends laterally relative to the aircraft whereby engagement of the saw with the tree is viewable by a pilot in the aircraft, and
cutting off a top of the tree with the saw.

14. The method of claim 13 including arranging the saw to define a plane that intersects the first boom at an angle of 135°.

15. The method of claim 13 including engaging the saw with the top of the tree at an angle of 45°.

16. The method of claim 13 including rotating the first boom relative to the aircraft so that the second boom is angled rearward relative to the aircraft.

17. The method of claim 13 wherein the aircraft is a helicopter.

18. The method of claim 13 including engaging a length of the second boom that extends below a lower edge of the saw with the tree for guiding the circular saw towards the top of the tree.

* * * * *